United States Patent Office 2,891,041
Patented June 16, 1959

2,891,041

PROCESS FOR THE POLYMERIZATION OF ETHYLENE

Albert S. Matlack, Wilmington, Del., assignor to Hercules Powder Company, Wilmington, Del., a corporation of Delaware No Drawing. Application May 27, 1957
Serial No. 661,567

8 Claims. (Cl. 260—94.9)

This invention relates to the polymerization of ethylene under relatively mild conditions of pressure and temperature and, more particularly, to an entirely new type of catalyst system for the polymerization of ethylene under such conditions.

K. Ziegler has described the polymerization of ethylene with organometallic compounds of the metals of group III-A of the periodic table, i.e., organometallic compounds of aluminum, gallium and indium to produce polymers varying in molecular weight from dimers up to the wax range polymers. He has also described the preparation of high molecular weight crystalline polymers by contacting ethylene with a mixture of an organoaluminum compound and a compound of a metal of group IV-B, V-B, VI-B or VIII of the periodic table.

Now in accordance with this invention it has most surprisingly been discovered that ethylene may be polymerized to a high molecular weight, crystalline polymer under relatively mild conditions of temperature and pressure by contacting ethylene with one of the metals of group V-B of the periodic table, i.e., vanadium, niobium (also called columbium) and tantalum, the metal being in a finely divided form and having a freshly exposed surface in contact with the ethylene. Not only is the process of this invention very effective for the polymerization of ethylene, but the crystalline polymer produced is a more highly saturated polymer than is produced by the prior art processes.

The polymerization of ethylene in accordance with this invention may be carried out in a wide variety of ways. It may be carried out in the presence or absence of an inert organic diluent as reaction medium. Generally, a diluent is used because it simplifies the isolation of the polymer at the end of the polymerization reaction. Any inert liquid organic diluent may be used, as for example, aliphatic hydrocarbons such as hexane, heptane, etc., cycloaliphatic hydrocarbons such as cyclohexane or aromatic hydrocarbons such as benzene, toluene, xylene, etc., or any mixture of such hydrocarbons.

As already pointed out above, the group V-B metal to be effective as a catalyst for the polymerization is preferably in a finely divided state and presents a freshly exposed surface to the ethylene with which it is contacted. Such finely divided or activated metals may be obtained by ball milling in an inert atmosphere, atomizing the molten metal into an inert atmosphere, reduction of metal oxide with hydrogen, dissolving away part of an alloy, various means of preparing it in colloidal form, etc. In general, the finely divided metal will have an average particle size varying from about 1 micron or less to about 100 microns and preferably from about 1 micron to about 20 microns. Any desired means may be used for contacting the ethylene with the finely divided metal having an active surface. A particularly effective method of carrying out the process in accordance with this invention is to ball mill the metal in the presence of ethylene, either with or without the hydrocarbon diluent. By so doing, a fresh surface of the metal catalyst is continually contacted with the ethylene being polymerized. A polymerization so started may be transferred to another vessel provided with adequate agitation such as with a high shear agitator. When operating in a ball mill, the metal may be in any desired shape, as for example, strip, foil, flake, etc., which will, of course, be reduced to the desired size during the ball milling operation, but for maximum efficiency it is preferably used in the form of finely divided powder or flake. Another method of operating the process is to atomize the molten metal into an inert gas, which after cooling to about 200° C. or less, is passed directly into the ethylene stream or mixture of ethylene and diluent. The process of this invention may be operated either on a batchwise scale or as a continuous operation.

The amount of the metal used as the catalyst may be varied over a wide range from a minor catalytic amount to a large excess and will, in general, be governed by the type of operation used. Thus in a ball mill relatively small amounts may be used, the maximum amount that may be used depending upon the efficiency of the ball mill operation with such larger amounts. On the other hand, larger amounts may be used when the metal is atomized into an inert gas and added to the ethylene stream, etc. Any one of the metals may be used as the catalyst or a mixture of them may be used. They may also be used in the form of their alloys with mercury or other metals.

The temperature and pressure used for the polymerization process may be varied over a wide range and will largely depend upon the method by which the ethylene is contacted with the surface of the metal. In general, the polymerization will be carried out at room temperature or slightly above, but any temperature within the range of from about —80° C. to about 200° C. may be used, preferably from about 0° C. to about 100° C., and more preferably from about 20° C. to about 60° C. In the same way, while atmospheric pressure or a pressure of only a few pounds may be used, the polymerization may be carried out over a wide range of pressures, but higher pressures do not appreciably alter the course of polymerization and, hence, are not required. In general, it is desirable to operate under anhydrous and anaerobic conditions.

The following examples will demonstrate the process of polymerizing ethylene in accordance with this invention. The molecular weight of the polymers produced in these examples is indicated by the reduced specific viscosity (RSV) given for each. By the term "reduced specific viscosity" is meant the $\eta$ Sp/C determined on an 0.1% solution of the polymer in decalin, containing 0.1 g. of the polymer per 100 ml. of solution (unless otherwise indicated), at 135° C. All parts and percentages are by weight unless otherwise indicated.

*Examples 1–3*

In these examples the polymerization was carried out in cylindrical vibratory ball mills which were constructed of stainless steel (analysis: carbon—0.008% max.; Cr—18.00–20.00%; Ni—8.80–10.00%; Mn—2.00% max.) and outfitted with a gas inlet tube and a main opening. The mills were 80% full of 0.5 inch stainless steel balls.

In each case the mill, previously dried for 4 hours at 120° C., was charged with 70 parts of n-heptane which had been dried over sodium and then with 2.0 parts of the catalyst metal, which was vanadium granules in Example 1, niobium powder in Example 2, and tantalum powder in Example 3. The mill was then capped, filled with dry nitrogen and evacuated, which procedure was repeated and then ethylene was injected to a pressure of 50 p.s.i.g. After 16 hours of milling at room temperature (about 30° C.) the polymer slurry was removed from the mill. The polyethylene was isolated by filtration. The polymer so obtained was purified by leaching with a 50:50 mixture of n-butanol and 48% hydrofluoric acid for 16 hours at room temperature, again separating by filtration and washing free of acid with water and ethanol, and then drying for 16 hours at 80° C. in vacuo. The final pressure, yield of polymer obtained in each case and physical properties are tabulated below, along with a control run wherein no metal was added as catalyst.

| Example | Catalyst Metal Added | Final Pressure, p. s. i. g. | Percent Conversion | RSV |
|---|---|---|---|---|
| Control | None | .50 | 0 | ---- |
| Ex. 1 | Vanadium | −7.5 | 60 | 1.1 |
| Ex. 2 | Niobium | −7 | 48 | 4.2 |
| Ex. 3 | Tantalum | −5.5 | 46 | 1.7 |

The many advantages of the process of this invention will be at once apparent to those skilled in the art. It is a halogen-free catalyst system, hence the problem of mold corrosion encountered on molding the polymer is eliminated. The use of the hazardous, spontaneously inflammable, aluminum alkyls, used in the prior art processes, is avoided. Other advantages lie in the better control that may be had in a one-component catalyst system, less equipment required, less need for blanketing operations with inert gases, etc.

The periodic chart used in this specification and appended claims for designating the groups and subgroups of the periodic table is that given in the "Handbook of Chemistry and Physics" published by Chemical Rubber Publishing Company, Cleveland, Ohio, on pages 392–3 of the 36th edition. Thus, the metals designated as groups IV–B, V–B, and VI–B are those that occur in the left-hand side of groups IV, V, and VI in the Mendeleev form of the periodic table (see Deming, "General Chemistry," sixth edition, 1952, John Wiley & Sons, Inc., New York).

What I claim and desire to protect by Letters Patent is:

1. The process of polymerizing ethylene which comprises contacting ethylene with a freshly exposed surface of a finely divided metal of group V–B of the periodic table, said group V–B metals being those on the left-hand side of group V of the Mendeleev form of the periodic table.

2. The process of claim 1 wherein the group V–B metal is vanadium.

3. The process of claim 1 wherein the group V–B metal is niobium.

4. The process of claim 1 wherein the group V–B metal is tantalum.

5. The process of polymerizing ethylene which comprises ball milling a mixture of ethylene and a finely divided metal of group V–B of the periodic table, said group V–B metals being those on the left-hand side of group V of the Mendeleev form of the periodic table.

6. The process of claim 5 wherein the metal is vanadium.

7. The process of claim 5 wherein the metal is niobium.

8. The process of claim 5 wherein the metal is tantalum.

References Cited in the file of this patent

UNITED STATES PATENTS 2,721,189    Anderson et al. _____ Oct. 18, 1955

FOREIGN PATENTS 534,792    Belgium _____ Jan. 31, 1955

OTHER REFERENCES

High Surface Sodium on Inert Solids, 1953, 19 pages, pages 9–11, U.S. Industrial Chemicals Company.